Sept. 26, 1950     C. P. LILJENGREN ET AL     2,523,960
SEAT CONSTRUCTION AND VEHICLE SEATING ARRANGEMENT
Filed June 2, 1947     5 Sheets-Sheet 4
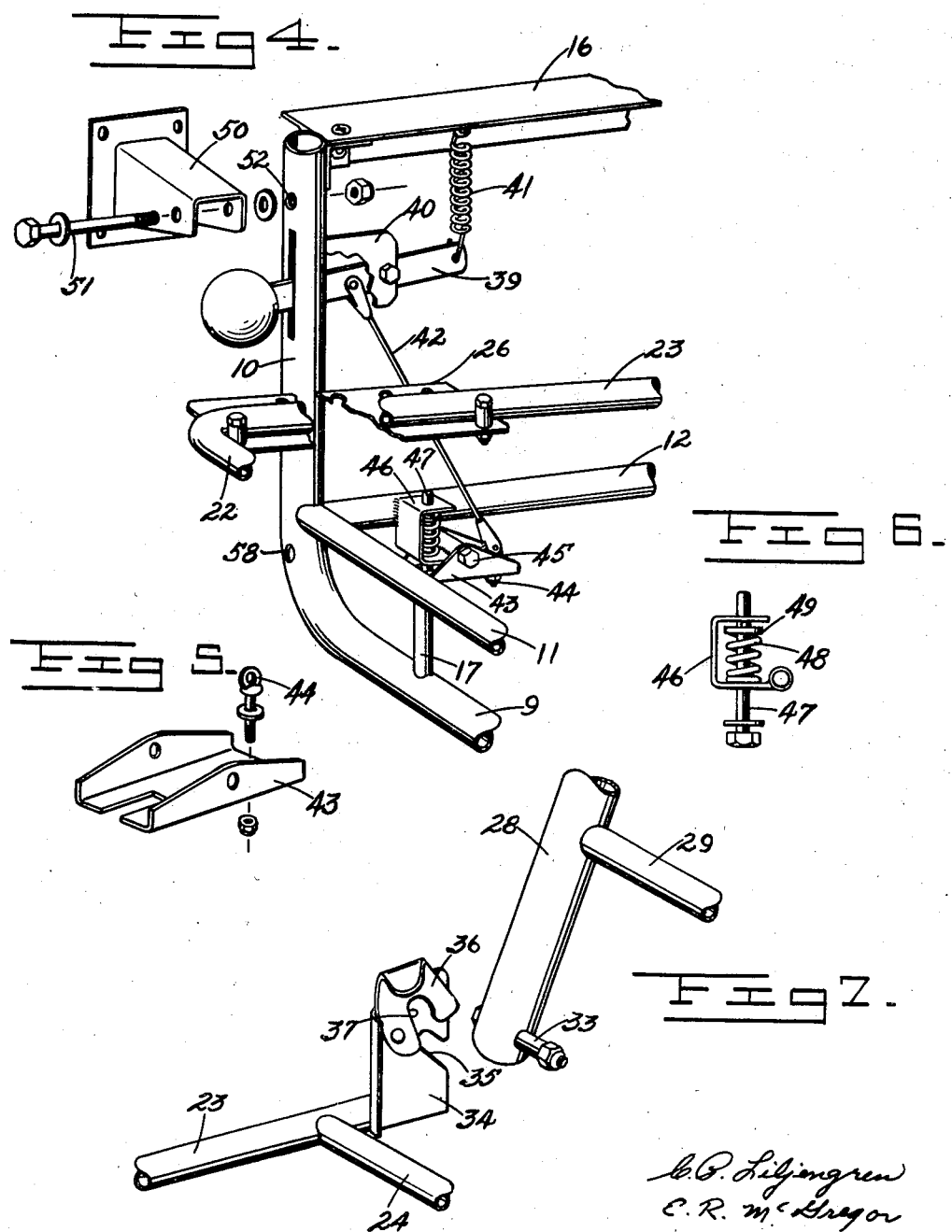
C. P. Liljengren
C. R. McGregor
INVENTOR.
BY Albert H. Kirchner
ATTORNEY

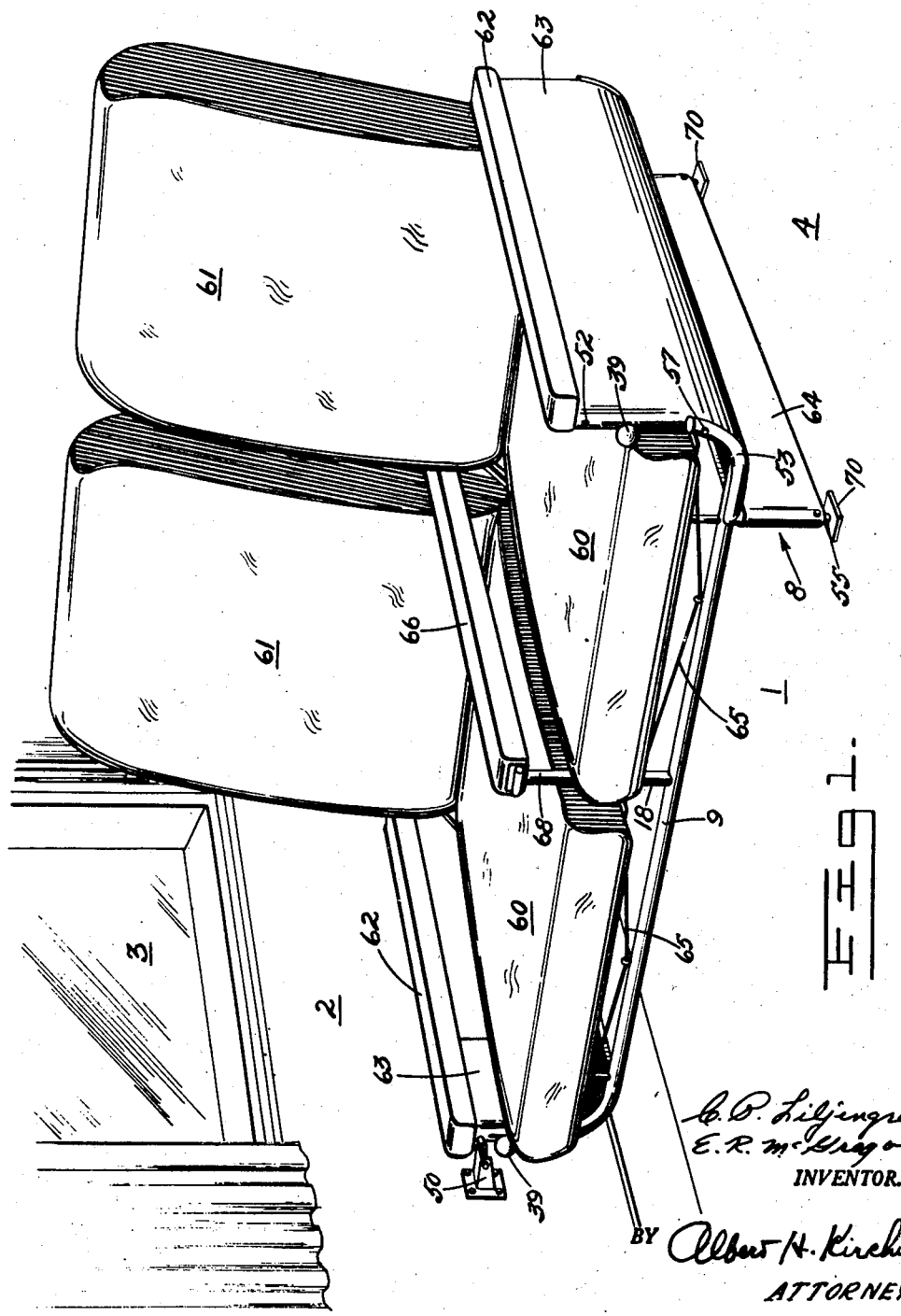

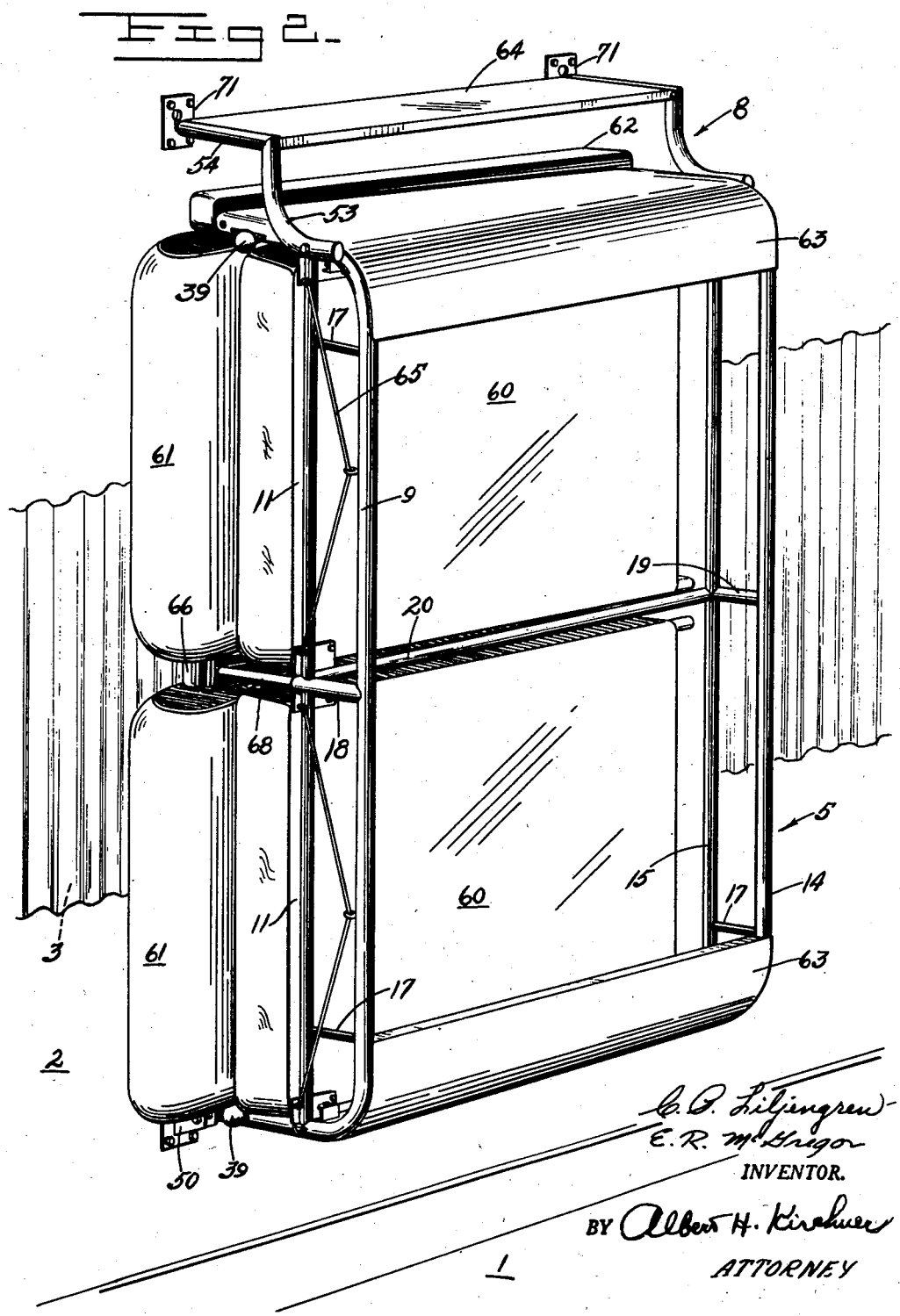

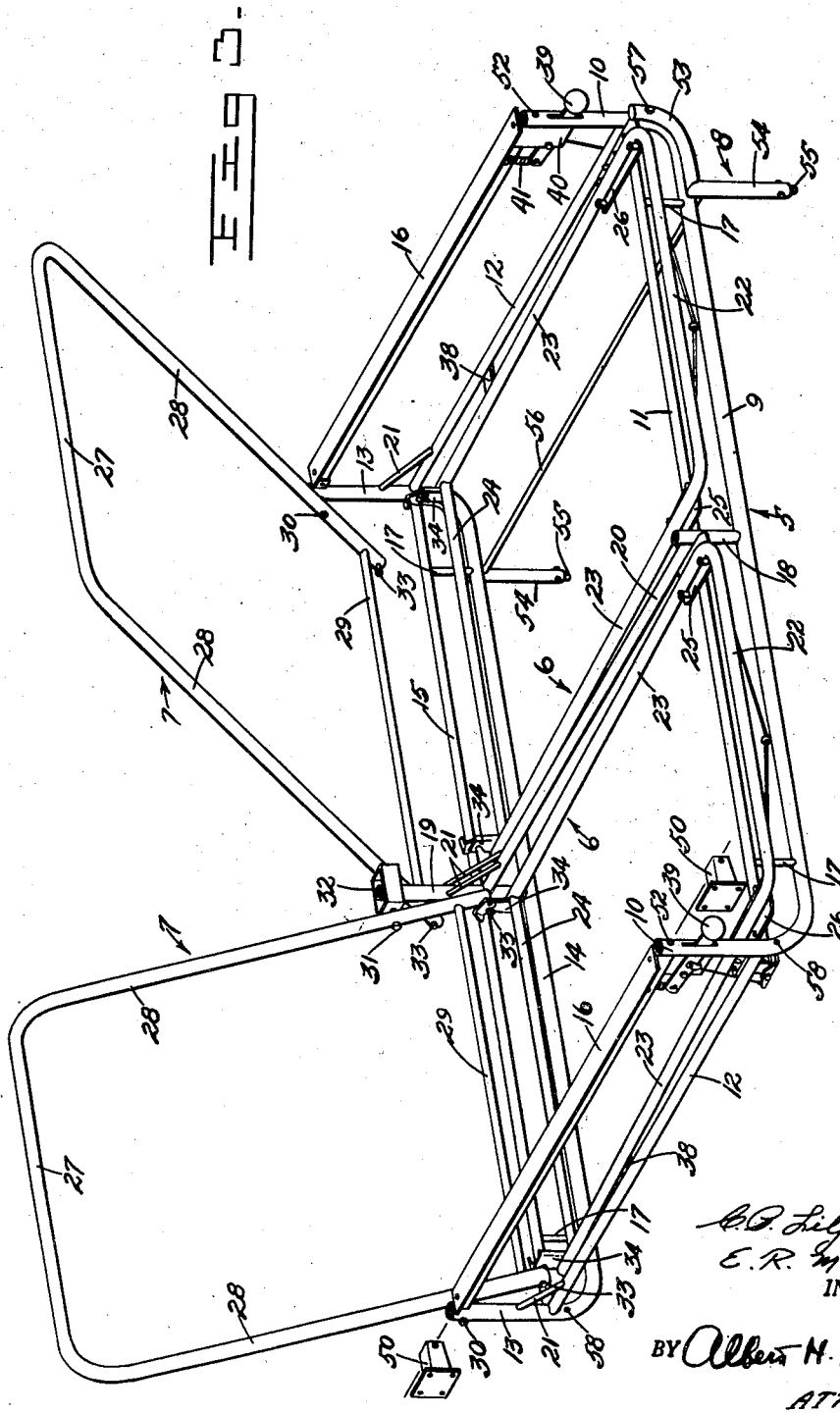

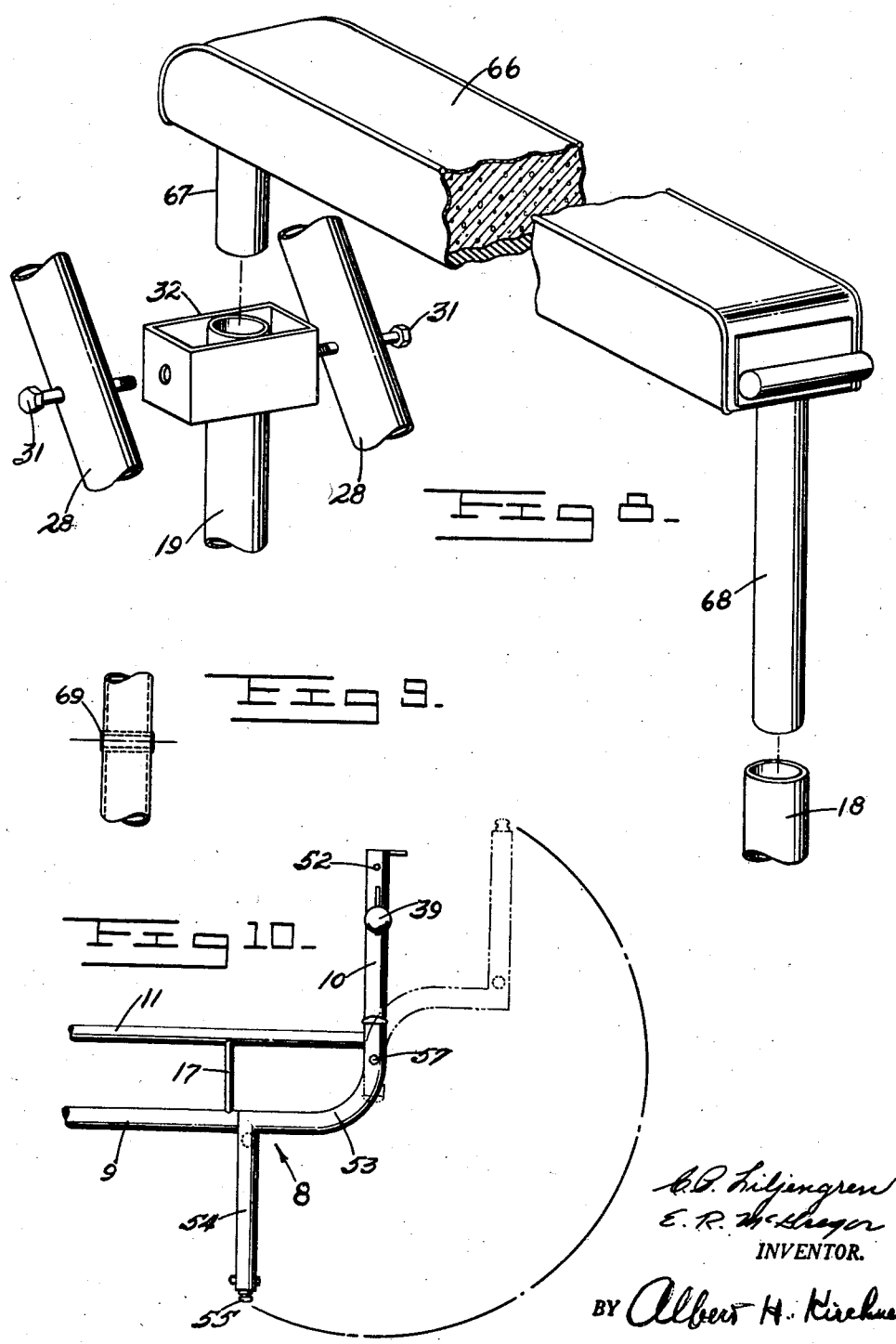

Patented Sept. 26, 1950

2,523,960

UNITED STATES PATENT OFFICE 2,523,960

SEAT CONSTRUCTION AND VEHICLE SEATING ARRANGEMENT

Curtis P. Liljengren, Coconut Grove, and Eugene R. McGregor, Miami, Fla., assignors to Flight Equipment and Engineering Corp., Miami, Fla., a corporation of Florida Application June 2, 1947, Serial No. 751,840

13 Claims. (Cl. 155—5)

The present invention relates to seats per se and to seat mountings and seating arrangements especially adapted to be used in vehicle interiors, which may, by way of example but not limitation, be the cabins of airplanes where it is desirable to convert the vehicle from passenger to freight service by disposing the seats selectively in operative or stowed position.

An important feature of the invention is the provision of a strong, lightweight, practical seat construction which will in one position comfortably and safely accommodate a passenger and which can be readily folded compactly into small compass and stowed securely against a side wall of the vehicle.

While the structures proposed by the invention are capable of being installed to advantage in vehicles generally, or even in fixed buildings, the preferred embodiments which have been selected to illustrate the invention were designed especially for airplane use and have certain advantages in such use and it will be convenient therefore to explain the inventive principles in terms of such embodiments and use. But such explanation is not to be considered as limiting the application of the principles, or the scope of the invention, to the particular details, purposes or uses herein described. Reference is made to the appended claims for definitions of the broad scope of the invention.

A general object of the invention, in the embodiments intended for airplane and analogous service, is to provide a foldable seat structure with cargo hold down means or fittings which will be exposed in operative position when the seat is stowed and which will afford secure and stable anchorage fixtures for affixing ropes, straps and the like which are required to be tied to and over the lading to prevent its shifting.

Another object is to make the seat foldable to a form or condition in which its upholstered surfaces will be well protected from contact with the enclosing structure of the vehicle or the like, such as the airplane cabin side wall, and from contact with cargo which may be crowded between the stowed seats.

A related object is to provide a seat which, when stowed in folded condition, will effectively protect the side wall, or other surface against which it is stowed, from damage that might result from contact by the cargo.

A further object is to incorporate all the foregoing and other advantages and features in a structure which may be mounted interchangeably on either side of a vehicle, with the two sides of the structure disposable equally well at the aisle or side wall, so that the making of special rights and lefts is avoided, and so that a single style of replacement structure can be substituted anywhere in an installation.

A general object of the invention is to make the structure simple and foolproof so that it can be operated rapidly by unskilled persons and will include relatively few parts all of which can be made rugged for a long life of satisfactory use.

Other objects are concerned with important structural details of the seat per se, such as the relationship of its base, back and seat proper, all of which will sufficiently appear as the preferred embodiments are explained hereinafter in this specification.

In the accompanying drawings, which form part of this application and which depict the preferred embodiment installed in an airplane cabin, Figure 1 is a perspective view of a twin seat unit disposed in open, operative position in the cabin of an airplane;

Fig. 2 is a perspective view of the same unit disposed in folded, stowed position;

Fig. 3 is a perspective view of the seat unit framework;

Fig. 4 is a detail perspective view of a front corner portion of the framework with a view, in separated position, of one of the side wall mounting brackets;

Fig. 5 is a perspective view of a seat bottom latching rocker element;

Fig. 6 is a side elevational view of a seat bottom latching bracket;

Fig. 7 is a perspective view of those portions of the seat bottom and seat back which are separably connectible to each other;

Fig. 8 is an exploded perspective view of those portions of the base, back and intermediate arm rest which are connected together;

Fig. 9 is an elevational view of a detail of one of the tubular framing elements showing a type of pivot or hinge pin bearing; and Fig. 10 is a front elevational view of a corner of the base showing the leg attached thereto and indicating the swinging movement of the leg between open and stowed positions of the unit.

Generally speaking, the invention, is incorporated in the specific preferred embodiment shown in the drawings, comprises a seat base which is hinged at one of its sides to a side wall of an airplane cabin and which has a leg structure hinged to its opposite side; this base mounts a seat bottom or frame and a seat back which is foldable down thereon; and fittings are fixed to the vehicle floor for securing the leg when the back is up and the seat is in opened, operative position, and other fittings are fixed to the side wall for securing the leg structure when the back is folded down and the base, bottom or frame and back are swung up as a unit and the leg is swung about its hinge to connect with the side wall fittings.

Such a construction may within the principles of the invention be embodied in a single seat unit or in a pair or more of adjacent seats integrally connected as a single unit. A twin seat unit is preferred and is depicted by the drawings and will now be described in detail.

In the drawings, the reference numeral 1 designates the flooor of an airplane cabin having a side wall 2 which may be provided with a window 3. An aisle area may be assumed at 4, and the seat construction which constitutes the present invention is installed, as best shown by Fig. 1, between the side wall and the aisle area.

The seat construction includes generally a framework, best shown in Fig. 3, which consists principally of a seat base 5, a seat bottom or frame 6 (two of which are employed in the twin-seat embodiment), a seat back 7 for each bottom or frame 6, and a leg 8 at the inboard side only (the side adjacent to the aisle) of the structure.

The seat base 5 and leg 8 are fixed against movement relatively to the floor and side wall when the seats are in their opened, operative positions of Fig. 1, but the frames 6 and backs 7 are adjustable on the base through a range of forward and rearward movement of the frames and of different degrees of inclination of the backs, all under the control of the occupant by means which will be hereinafter explained.

The base 5 is preferably made of light tubular metal stock including a lower front cross member 9 turned up at its ends to form front posts 10 which are additionally connected by an upper front cross member 11 spaced a short distance above the member 9. Lower side members 12 connect the posts 10 with the similar rear posts 13 which are turned up from the ends of a lower rear cross member 14. An upper rear cross member 15 connects the rear posts 13 at the level of the members 11 and 12. Upper side members 16, which may be angle irons or T-irons connect the posts 10 and 13 at about the level of their tops. Small struts 17 join and brace the front members 9 and 11 and the rear members 14 and 15, respectively, near the ends of these members, and further bracing is provided by a relatively short front middle post 18 and a higher rear middle post 19, which are secured respectively to the front members 9 and 11 and to the rear members 14 and 15 and are connected to the ends of a central longitudinal member 20. Diagonal braces 21, acting like gussets, may be used to brace the junctions of the elements 20 and 19, and 12 and 13 at both sides of the framework, and to perform an additional function hereinafter to be explained.

With the elements thus far identified welded or equivalently secured together, the resulting framework is strong, rigid and light in weight and is admirably suited to support the two seat bottoms or frames 6.

Each of these frames consists of a front cross member 22, a pair of side members 23, and a rear cross member 24, all of these members of each frame being integral or welded together, so that a strong, rigid rectangular flat frame is provided in each case. Each of these frames rests slidably on the upper front cross member 11 of the base, preferably through the medium of a wear plate secured to the bottom of each front corner of the frame. The two adjacent inner wear plates are designated 25, and the two outer wear plates are designated 26. These plates are identical except that the outer plates 26 are each formed with a lengthwise aligned series of perforations to receive a pin for latching the frames in longitudinally adjusted positions on the base, as will be hereinafter explained.

Each seat back 7 consists of a rectangular frame made up of a top cross member 27, two side members 28, and a bottom cross member 29, all integral or welded together. Each back frame is hinged to the rear posts 13 and 19 of the base by means of pivot pins 30 journaled in the upper portions of the posts 13 and in the adjacent members 28 of the backs and by means of pins 31 (see Fig. 8) journaled in the opposite members 28 and in a box bracket 32 which is secured to the top of the rear post 19 and has enough width to space the two backs adequately to admit a separating common armrest between them.

Each seat back 7 is connected to the adjacent seat bottom or frame 6 by a pin 33 (see Fig. 7) which projects inwardly from the lower end of each back frame side member 28 and which interfits with a bracket 34 mounted in upstanding position at each rear corner of each of the seat bottoms or frames 6. The connections between these pins and brackets are made separable, preferably by the construction shown in detail in Fig. 7, which consists in forming a notch 35 in each bracket 34 to admit the pin and providing a pivoted catch 36 having a notch 37 for closing the notch 35 and completely encircling the pin 33 by complemental portions of the two notches.

It will be evident that, with the backs 7 connected to the bottoms or frames 6, the bottoms may be slid back and forth on the base 5, with the upper front cross member 11 directly supporting the front of each seat bottom and with the load on the rear of each seat bottom hanging from the pivot pins 30 and 31, and that in all such movements the seat backs will incline correspondingly. It will also be evident that the latch means 34, 36 may be opened to disconnect the backs from the bottoms so that the backs may be folded down into substantial parallelism with the bottoms, the initiation of this movement being shown at the right hand side of Fig. 3. With a back released from its bottom 6, the rear portion of the bottom may be supported on the base 5 by short brackets 38 instanding from the base side members 12.

Mechanism for controlling the forward and rear setting of the seat bottoms 6, and consequently also that inclination of the backs 7, is located at the front outer side of each seat. In the preferred, illustrated embodiment as shown in detail in Figs. 4, 5 and 6 this comprises a lever 39 projecting through a slot in the post 10, fulcrumed on a plate 40 secured in the corner formed by the junction of the post and adjacent upper side member 16 of the base 5. A spring 41, under tension between the member 16 and the rear of the lever, keeps the projecting portion of the lever, which is conveniently provided with a hand knob, in lowered position in the post slot. Elevating the lever pulls a flexible link to rotate a rocker 43 to which the link is connected by an anchor eye 44. The rocker is fulcrumed on a pin 45 journaled in a U-shaped bracket 46 which is welded to the lower side member 12 of the base 5. A fork in the work arm of the rocker 43 spans the head of a pin 47 passing through vertically aligned holes in the bracket 46 to pull the pin down when the knob of the lever 39 is lifted, and on release of the lever a coil spring 48 acts in tension between the bottom of the bracket 46 and an abutment 49 fast on the pin 47 to project the pin to its full upward limit. When retracted, the pin clears the openings in the wear plate 26 so that this plate and the seat bottom or frame 6 to which it is secured can be slid fore and aft on the member 11 of the base 5. When released, the pin enters one of the openings in the wear plate, thus latching the seat bottom in the adjusted position determined by the particular opening that is entered.

The unit formed by the frame parts thus far described is supported on the side wall of the airplane or other vehicle or enclosure at the outboard side of the unit, and it is supported on the floor of the plane or the like by means of the leg 8 at the inboard side of the unit.

The outboard support comprises a pair of brackets 50 bolted to the side wall in lengthwise spaced relation at sufficient height and spacing to permit a hinge pin 51 journaled in each bracket to enter and be held in a hole 52 formed through each of the adjacent front and rear posts 10 and 13.

The inboard support, consisting of the leg 8, comprises at the front a short length 53 of tubing or the like conforming to the curved shape of the joined portions of the member 9 and its posts 10, and a vertically downwardly extending pedestal 54 terminating in a foot 55 in the form of a short projecting pin having a peripheral undercut just behind its end. The parts 53, 54 and 55 are duplicated at the rear of the leg, and both assemblies are braced by a stretcher 56 which connects the pedestals 54. The leg is hinged to the base 5 by pins 57 secured through holes in the members 53 and holes 58 in the posts 10 and 13. Thus the leg may be disposed in its supporting position shown in Fig. 3, in which the base 5 rests on the stretcher 56 and the load is transmitted to the floor 1 axially through the two pedestals 54, or the leg may be disposed in its folded position shown in broken lines in Fig. 10 by swinging it some 180° more or less outwardly about the common axis of the two hinge pins 57.

It is noteworthy that holes 52 for the wall bracket pins 51 are formed in the front and rear posts 10 and 13 at both sides of the seat unit, inboard as well as outboard, and that holes 58 for the leg hinge pins 57 are similarly duplicated at the outboard and inboard sides. Hence either side of the whole unit can be hinged to a pair of side wall brackets, and either side can be mounted on a leg, so that the unit is interchangeable between the sides of a vehicle or other enclosure and need be made in only one form for any original installation or replacement.

Thus far we have described the principal framing structure of the seat units. The complete structure includes suitable upholstered or other cushions, 60 for the seat bottoms 6, and 61 for the backs 7, each mounted in place on its frame in any appropriate way. Outer arm rests 62 may be secured over the base upper side members 16, and a sheet metal or equivalent panel skirting 63 and 64 may be used to trim the base sides and the leg, respectively. Stout rubber cords 65, called bungees, may be laced between the members 9 and 22 of the base and seat bottoms to hold the bottoms down and to assist in returning the seats from forwardly projected position.

A common intermediate arm rest 66 is provided at each of its ends with a depending leg in the form of a tube or rod of small enough diameter and sufficient length to fit tightly in the open ends of the tubes which form the posts 18 and 19. Fig. 8 shows such a tube or rod 67 at the rear and 68 at the front of the arm rest 66.

Fig. 9 depicts a convenient way of forming and reinforcing such openings in the tubular members as those which bear the pins 57, 51, 31, 30, etc. This consists in welding or otherwise securing a sleeve 69 of good bearing metal, provided in ample proportions, in openings drilled diametrically through the tubular members.

Passenger safety belts (not shown) may be connected to the two diagonal braces 12 at the rear of each seat, thus anchoring two belts for each seat at a fixed part of the seat base.

In the opened, operative position of the seats shown in Fig. 1, the backs 7, with the cushions 61 attached to them, are in raised position, and the leg 8 is in lowered position supporting its side of the entire structure. It is convenient to have floor plates 70 fixed in spaced relation along the floor to receive in sockets formed in them the feet 55 of the legs, and if desired or thought necessary these sockets may include spring pin or other detent means cooperating with the undercut of each foot to latch the foot against undesired upward movement. With the structure thus disposed the vehicle is ready for passenger service.

To convert for cargo service, the backs 7 with their cushions 61 remaining attached are disconnected from the seat bottoms by opening the catches 36. Then the backs and cushions are folded down onto the seat cushions, the leg is lifted slightly to pull its feet clear of the sockets in the plates 70, and the leg is swung upwardly about its hinge pins 57, as indicated in Fig. 10. The entire unit is then swung upwardly about the hinge pins 51 of the wall brackets 50 to the vertical positions shown in Fig. 2, and the feet 55 are dropped into keyhole slots or the equivalent in socket plates 71 which are fixed in spaced relation along the upper zone of the side wall. In this position of the parts the entire assembly is compactly folded in close juxtaposition to the side wall and is securely held in that position. The side walls and their windows and other trim are protected by the folded assemblies, and the now vertically disposed members 9 and 11, and the now horizontally disposed members 18, 17 and 20, provide a fine variety of strong and well located anchorage points for cargo tie down ropes, straps and the like.

It is believed that the essential and other desirable details of the preferred form of embodiment of the invention will from the foregoing be sufficiently evident to those skilled in the art to which the invention relates. The broad principles of the invention will now be pointed out in the appended claims.

We claim:

1. In combination with the floor and side wall of a vehicle interior, a seat comprising a seat base having at one side a hinge connected to a lower portion of the side wall and having at its other side a leg hinged at its top to the base and separably connected at its bottom to the floor, and a fastener mounted on the upper portion of the side wall adapted to have the bottom of the leg connected to it when the base and leg are swung upwardly about their respective hinges.

2. The combination claimed in claim 1 in which the leg is provided with a foot and the floor and side wall are provided with socket means for receiving and holding the foot.

3. The combination claimed in claim 1 in which the seat is provided with a back hinged at the rear of the base for folding down on to the base prior to the base being swung upwardly, whereby the back is disposed between the base and side wall when the leg is connected to the side wall fastener.

4. The combination claimed in claim 1 including a seat base having at its bottom a pair of spaced parallel transverse members which are superposed when the seat is down, and posts connecting the members, whereby the members are disposed vertically and the posts horizontally when the seat is elevated and form cargo tie attaching means.

5. In combination with the floor and side wall of a vehicle interior, a seat comprising a seat base having at one side a hinge connected to a lower portion of the side wall and having at its other side a leg hinged at its top to the base and normally having its bottom end resting on the floor, and a fastener mounted on the upper portion of the side wall adapted to have the bottom of the leg connected to it when the base and leg are swung upwardly about their respective hinges.

6. In combination with the floor and side wall of a vehicle interior, a seat structure comprising a seat base having at one side a hinge connection to a lower portion of the side wall and having a leg hinged to its opposite side for swinging movement to a position extending downwardly from the base for supporting the base on the floor and to a position extending upwardly from the base, a back foldable down on the base, and fastening means on the side wall above the level of the hinge connection for securing the free end portion of the leg to the side wall when the back is folded down on the base and the leg and base are swung upwardly about their hinges.

7. The combination claimed in claim 6 in which the hinge connection for the base to the lower portion of the side wall is detachable and adapted to be attached selectively to either side of the base, and in which the leg is detachable and adapted to be hinged selectively to either side of the base, and in which each opposite side wall of the vehicle interior is provided with fastening means for selectively securing the free end portion of the leg thereto and with means for mounting said hinge connection, whereby the seat structure may be mounted selectively adjacent to either of said side walls.

8. In combination with the floor and side wall of a vehicle interior, a seat structure having a back foldable down to collapsed position and having at one side a hinge connection to a lower portion of the side wall and having a leg hinged to its opposite side for swinging movement to a position extending downwardly from the seat structure for supporting the structure on the floor and to a position extending upwardly from the structure, fastening means on the floor for securing the free end portion of the leg to the floor when the leg extends downwardly from the structure, and fastening means on the side wall above the level of the hinge connection for securing the free end portion of the leg to the side wall when the back is folded down to collapsed position and the leg and base are swung upwardly about their hinges.

9. The combination claimed in claim 8 in which the hinge connection for the seat structure to the lower portion of the side wall is detachable and adapted to be attached selectively to either side of the structure, and in which the leg is detachable and adapted to be hinged selectively to either side of the structure, and in which each opposite side wall of the vehicle interior is provided with fastening means for selectively securing the free end portion of the leg thereto and with means for mounting said hinge connection, whereby the seat structure may be mounted selectively adjacent to either of said side walls.

10. A seat for a vehicle interior having a floor including an aisle and having also a pair of side walls each provided with a hinge-fitting in its lower portion and fastening means in its upper portion, said seat comprising a base having at each side a connection adapted to be pivotally secured to one of said side wall hinge-fittings and having also at each side another hinge connection, and a leg pivotally connected to one of said other hinge connections for swinging movement between a position in which the leg extends downwardly from the base for positioning its free end on the floor and a position in which the leg extends upwardly from the base for engagement with a corresponding one of said upper fastening means, said leg being detachable from the last named other hinge connection and adapted to be connected to the hinge connection at the other side of said base whereby the seat is adapted to be mounted at either side of the aisle for stowing in vertical position on the side wall to which the base is pivotally secured.

11. The combination claimed in claim 10 in which the vehicle floor is provided with fastening means adapted to be engaged by the leg when the leg extends downwardly from the base for securing the leg to the floor.

12. A seat for a vehicle having a side wall and a floor comprising a seat base having at one side hinge means adapted to secure the base in hinged relation to said side wall for swinging upwardly against the side wall and having at its other side a leg hinged at its top to the base for swinging movement to a position extending downwardly from the base for supporting the base on the floor and to a position extending upwardly from the base, and means on the free end of the leg adapted to engage the floor in the first named position of the leg and adapted in the second named position thereof to fasten the leg to the side wall for stowing the seat in vertical position against the side wall.

13. The combination claimed in claim 12 in which the seat is provided with a back hinged to the rear of the base for folding down on to the base prior to the base being swung upwardly, whereby the back may be disposed between the base and side wall when the seat is stowed in vertical position against the side wall.

CURTIS P. LILJENGREN.
EUGENE R. McGREGOR.

REFERENCES CITED

The following references are of record in the file of this patent:

UNITED STATES PATENTS

| Number | Name | Date |
|---|---|---|
| 141,318 | Buchanan | July 20, 1873 |
| 1,253,549 | Weaver | Jan. 15, 1918 |
| 1,272,076 | Montgomery | July 9, 1918 |
| 1,589,460 | Cosgrove | June 22, 1926 |
| 1,593,477 | Speyer | July 20, 1926 |
| 1,759,878 | Zizzo | May 27, 1930 |
| 1,888,787 | Carlson | Nov. 22, 1932 |
| 2,020,397 | Caughey | Nov. 12, 1935 |
| 2,140,122 | Westrope et al. | Dec. 13, 1938 |